Patented Nov. 9, 1948

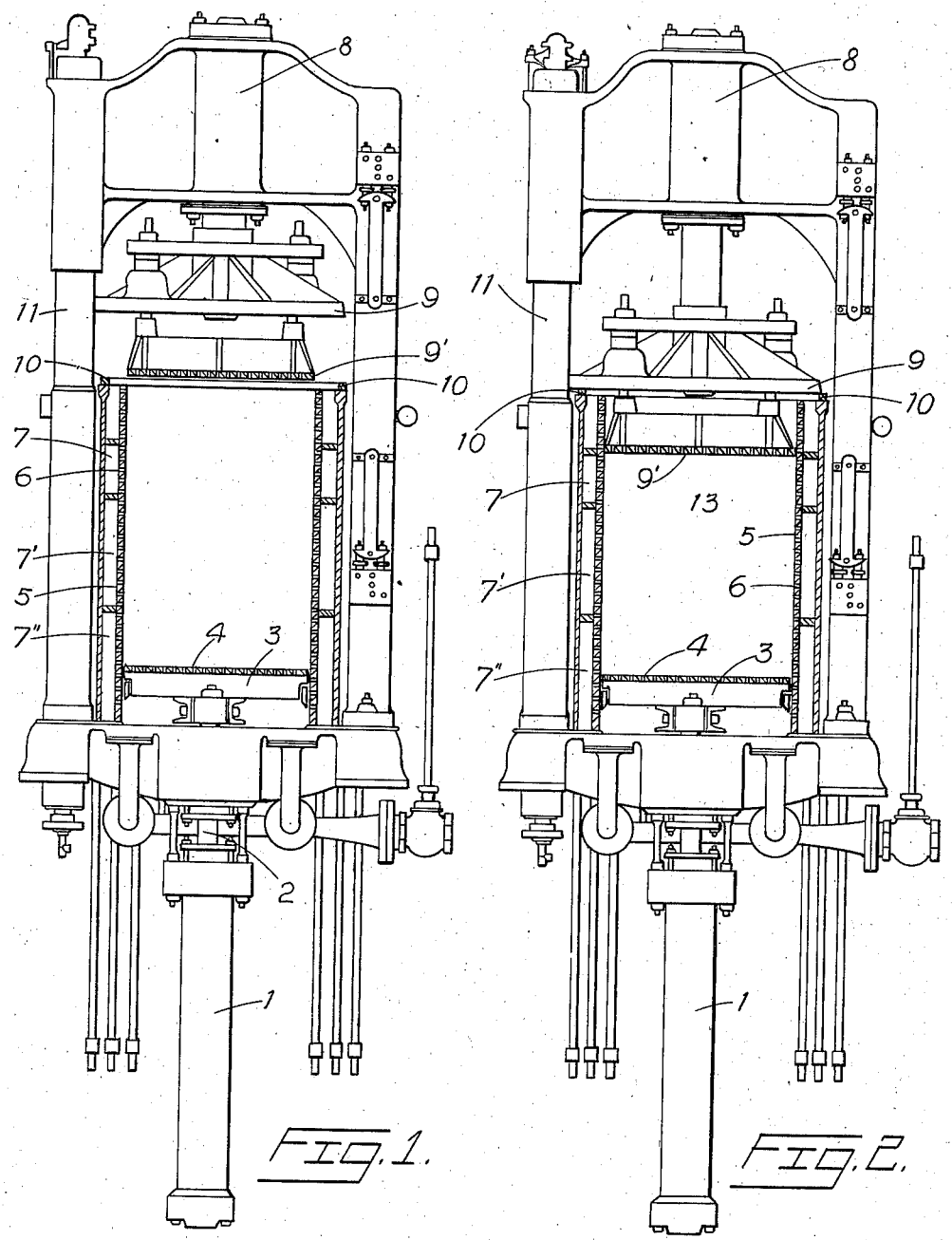

2,453,568

UNITED STATES PATENT OFFICE 2,453,568

APPARATUS FOR THE MANUFACTURE OF CORKBOARD BY INJECTION OF A HEATED GAS

Cipriano Ribeiro Calleia, Lisbon, Portugal

Application September 13, 1945, Serial No. 616,097
In Portugal September 15, 1944

5 Claims. (Cl. 18—6)

This invention relates to improved apparatus for use in the manufacture of cork boards or blocks, or the like, by the passage of steam or a heated gas therethrough. Granulated cork compressed with various binders, for sundry purposes, has been used for many years, chiefly for the utilization of the waste, virgin cork or poor quality cork unsuitable for the manufacture of corkwood, cork stoppers, and other articles.

Generally speaking, the manufacture of such corkboard formerly comprised the compression of the cork granules in moulds which were introduced into ovens for the making of corkboard by the mixture of the granules with the resins, etc. of the cork and the products of the partial decomposition of the same. It has also been proposed to treat the cork by forcing steam or any heated non-combustible gas into the body of granulated cork compressed in a mould, instead of heating it from the outside as it was exclusively done until then.

In view of the great insulating power of the cork, it was difficult to obtain an uniform heating all over the whole block, because the periphery in direct contact with the plates of the mould was not heated as the material on the inside of the mould prevented the heat from reaching the periphery, which thus presented different colouring and different properties from those of the remaining parts of the block.

According to the present invention, uniform treatment of the material is effected exclusively by internal heat, and in such a way that all the granules receive simultaneously the same degree of heat which is obtained by the apparatus hereinafter described, which permits the passage of steam or a conveniently heated gas through holes in all the plates which compose the mould, so that the pressure, temperature and quantity of steam or gas may vary from plate to plate and within each plate, from portion to portion, in accordance with rules established by experience.

Finally, the upper press is mounted on a column around which it rotates, in order to disencumber the mouth of the mould through which the finished block is ejected by means of the ejecting press as above mentioned, which works as the bottom of the mould.

For a clear understanding of the invention, the attached drawings show one form of the invented apparatus.

Fig. 1 is a cross-section of the apparatus before commencing the compression of the material;

Fig. 2 shows the apparatus after the compression of the material and during the baking of the cork;

Figs. 4 and 5 are diagrams showing the arrangement of the openings in the bottom, cover, and side walls respectively of the mould.

Figure 3:
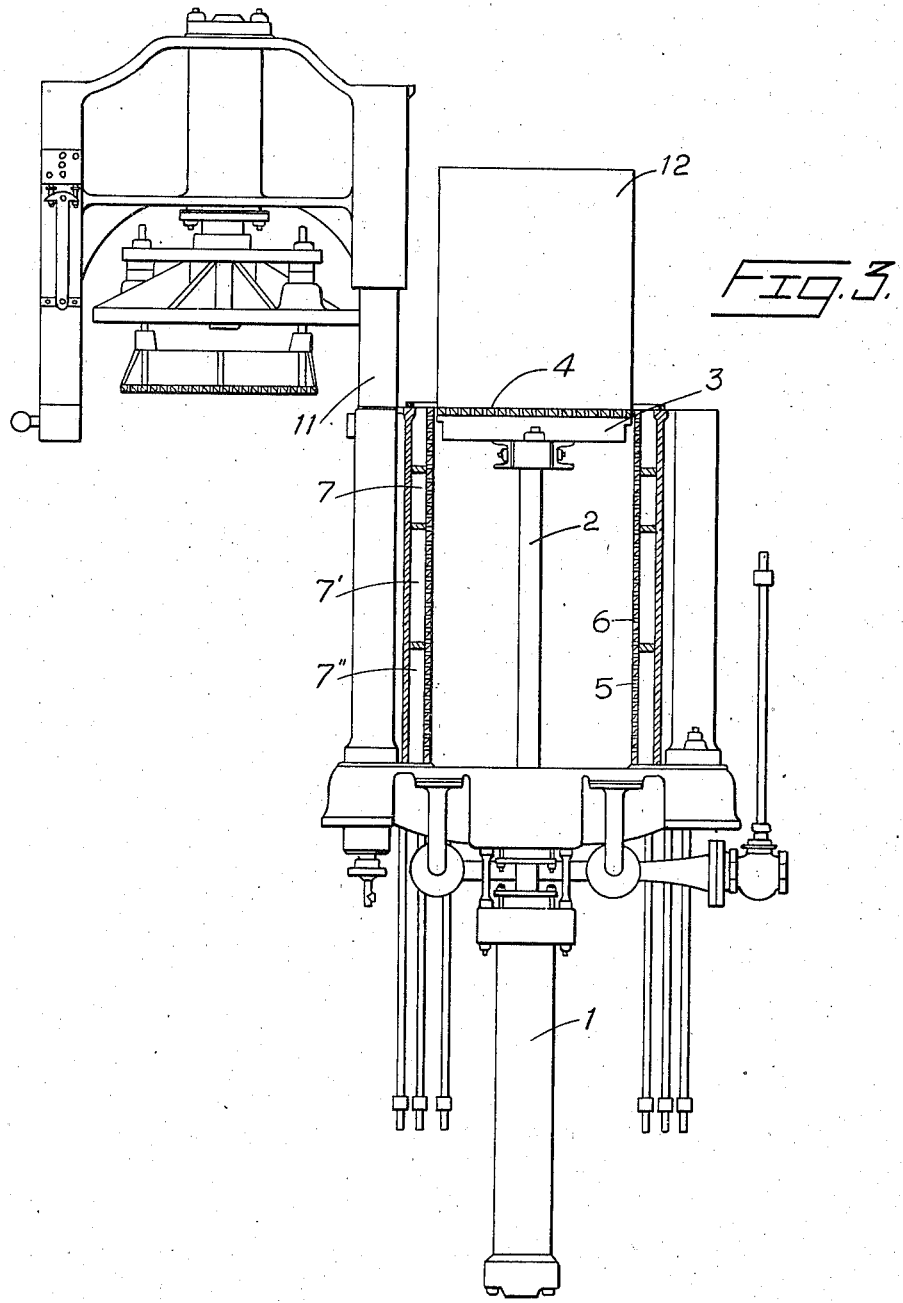
Fig. 3 shows the apparatus opened for the extraction of the finished block.

In the drawings 1 represents the cylinder whose piston rod 2 supports the member 3 whose plate 4 constitutes the bottom of the mould and is perforated for the admission of steam. The side plates 5 of the mould are, likewise, provided with holes 6 through which steam from the annular chambers (7—7'—7'')—three in the present example—passes into the mould. The compressing press 8 is provided with two parallel press blocks 9—9' adjustable with respect to each other and the lower block 9' is applied against the material and compresses it to the desired degree, whereas the upper block 9 constitutes the lid of the mould and is made fluid tight by means of a gasket 10. In the position indicated in Fig. 2, there is, between the two blocks, a chamber through which the steam flows out after having passed through the granulated material 13 compressed in the mould. The upper press is mounted on a column 11 which allows it to rotate in order to uncover the mould for the ejection of the finished block 12 (Fig. 3) by means of the extracting press 1, 2 and the subsequent filling of the mould with material for a further operation.

By utilizing the present invention, it is possible to manufacture blocks of corkboard perfectly uniform and homogeneous, measuring, say, 0.97 x 0.97 x 0.97 metres, in about 15 to 17 minutes, a result having a great improvement over all the means known up to the present.

Besides those advantages already mentioned, the apparatus according to the invention dispenses with the usual covers of the moulds used in almost every other known method, such known covers are always difficult to handle and are frequently very dangerous. In the present case, it is the compressing press, itself, which shuts the mould and acts as a safety valve as, in fact, there being no bolts, it is automatically lifted when pressure exceeds a predetermined limit for which it has been regulated.

What is claimed is:

1. Apparatus for the manufacture of corkboard blocks and the like comprising a mould having perforated end plates and perforated side walls for directly engaging the block, means for first compressing the material in the mould, means for then admitting heated gas through one of the end plates and inwardly through all the side walls to penetrate the compressed material, means whereby such gases all escape through the second end wall, and means for the removal of the material from the mould.

2. Apparatus according to claim 1, having a plurality of separate chambers for the supply of the heated gases to groups of perforations in the side walls.

3. Apparatus according to claim 1, in which the perforations in at least one of the end plates are arranged in groups and the perforations in one group are of larger dimensions than those in an adjacent group.

4. Apparatus according to claim 1 having a closure for the mould so arranged that said closure serves as a safety valve for the mould.

5. Apparatus according to claim 1 in which the means for compressing the material comprises a pressure head, a column carrying said head, and means whereby the head may be turned about said column to uncover the mould.

CIPRIANO RIBEIRO CALLEIA.

REFERENCES CITED

The following references are of record in the file of this patent:

UNITED STATES PATENTS

| Number | Name | Date |
|---|---|---|
| 436,314 | Osborne | Sept. 9, 1890 |
| 605,706 | Enzinger | June 14, 1898 |
| 1,607,047 | Bertelsen, Jr. | Nov. 16, 1926 |
| 2,041,377 | Schwarz | May 19, 1936 |
| 2,167,800 | Flotron | Aug. 1, 1939 |
| 2,250,697 | Basett | July 29, 1941 |
| 2,339,458 | Champney | Jan. 18, 1944 |